(12) United States Patent
Savchenkov et al.

(10) Patent No.: US 8,057,283 B1
(45) Date of Patent: Nov. 15, 2011

(54) METHOD OF FABRICATING A WHISPERING GALLERY MODE RESONATOR

(75) Inventors: Anatoliy A. Savchenkov, Glendale, CA (US); Andrey B. Matkso, Pasadena, CA (US); Vladimir S. Iltchenko, Arcadia, CA (US); Lute Maleki, Pasadena, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 855 days.

(21) Appl. No.: 12/119,989

(22) Filed: May 13, 2008

(51) Int. Cl.
*B24B 1/00* (2006.01)
(52) U.S. Cl. ............................................ 451/53; 451/57
(58) Field of Classification Search .................. 451/37, 451/53, 57, 41
See application file for complete search history.

(56) References Cited

U.S. PATENT DOCUMENTS

| | | | |
|---|---|---|---|
| 5,307,358 A | 4/1994 | Scheps | |
| 7,248,763 B1 * | 7/2007 | Kossakovski et al. | 385/32 |
| 7,292,112 B2 | 11/2007 | Oxborrow | |
| 7,440,651 B1 * | 10/2008 | Savchenkov et al. | 385/28 |
| 2005/0044893 A1 * | 3/2005 | Coon et al. | 65/32.1 |
| 2007/0001773 A1 | 1/2007 | Oxborrow | |
| 2007/0025670 A1 | 2/2007 | Pan et al. | |

OTHER PUBLICATIONS

Rempe, et al., "Measurement of ultralow losses in an optical interferometer," Opt. Lett. 17, 363-365 (1992).

Hood, et al., "Characterization of high-finesse mirrors: Loss, phase shifts, and mode structure in an optical cavity," Phys. Rev. A 64. 033804 (2001).
Bilger, et al., "Origins of fundamental limits for reflection losses at multilayer dielectric mirrors," Appl. Opt. 33, 7390-7396 (1994).
Cho, et al., "Effects of substrate and deposition method onto the mirror scattering," Appl. Opt. 45, 1440-1446 (2006).
Purcell, "Spontaneous emission probabilities at radio frequencies," Phys. Rev. 69, 681-681 (1946).
Matsko, et al., "Optical hyperparametric oscillations in a whispering-gallery-mode resonator: Threshold and phase diffusion," Phys. Rev. A 71, 033804 (2005).
Ilchenko, et al., "Nonlinear Optics and Crystalline Whispering Gallery Mode Cavities," Phys. Rev. Lett. 92, 043903 (2004).
Vernooy, "High-Q measurements of fused-silica microspheres in the near infrared," Opt. Lett. 23, 247-249 (1998).
Kippenberg, "Demonstration of ultra-high-Q small mode volume toroid microcavities on a chip," Appl. Phys. Lett. 85, 6113-6115 (2004).
Grudinin, "Ultrahigh optical Q factors of crystalline resonators in the linear regime," Phys. Rev. A 74, 063806 (2006).
Spillane, et al., "Ultralow-threshold Raman laser using a spherical dielectric microcavity," Nature 415, 621-623 (2002).

(Continued)

*Primary Examiner* — Robert Rose
(74) *Attorney, Agent, or Firm* — Mark Homer

(57) ABSTRACT

A method of fabricating a whispering gallery mode resonator (WGMR) is provided. The WGMR can be fabricated from a particular material, annealed, and then polished. The WGMR can be repeatedly annealed and then polished. The repeated polishing of the WGMR can be carried out using an abrasive slurry. The abrasive slurry can have a predetermined, constant grain size. Each subsequent polishing of the WGMR can use an abrasive slurry having a grain size that is smaller than the grain size of the abrasive slurry of the previous polishing iteration.

20 Claims, 3 Drawing Sheets

OTHER PUBLICATIONS

Grudinin et al., "Ultralow-threshold Raman lasing with CaF2 resonators," Opt. Lett. 32, 166-168 (2007).

Kippenberg, et al., "Analysis of Radiation-Pressure Induced Mechanical Oscillation of an Optical Microcavity" Phys. Rev. Lett. 95, 033901 (2005).

Kippenberg, et al., "Kerr-Nonlinearity Optical Parametric Oscillation in an Ultrahigh-Q Toroid Microcavity," Phys. Rev. Lett. 93, 083904 (2004).

Savchenkov, et al., "Low Threshold Optical Oscillations in a Whispering Gallery Mode CaF2 Resonator," Phys. Rev. Lett. 93, 243905 (2004).

Braginsky, et al., "Experimental observation of fundamental microwave absorption in high quality dielectric crystals," Phys. Lett. A 120, 300-305 (1987).

Savchenkov, et al., "Ringdown spectroscopy of stimulated Raman scattering in a whispering gallery mode resonator," Opt. Lett. 32, 497-499 (2007).

Savchenkov, et al., "Kilohertz optical resonances in dielectric crystal cavities," Phys. Rev. A 70, Art. No. 051804R (2004).

Matsko, et al, "Ring-down spectroscopy for studying properties of CW Raman lasers," Opt. Commun. 260, 662-665 (2006).

Wang, et al., "Linear birefringence in CaF2 measured at deep ultraviolet and visible wavelengths", J. Microlithography, Microfabrication, and Microsystems 3, 115-121 (2004).

Deuster, et al., "Studies of the facetting of the polished (100) face of CaF2," Journal of Crystal Growth 250, 313-323 (2003).

Zhao, et al., "Fabrication of internal diffraction gratings in calcium fluoride crystals by a focused femtosecond laser," Opt. Express 12, 742-746 (2004).

\* cited by examiner

METHOD OF FABRICATING A WHISPERING GALLERY MODE RESONATOR

STATEMENT AS TO FEDERALLY-SPONSORED RESEARCH

The invention described herein was made in the performance of work under a NASA contract, and is subject to the provisions of Public Law 96-517 (U.S.C. 202) in which the Contractor has not elected to retain title.

FIELD OF THE INVENTION

The present teachings relate to a whispering gallery mode resonator (WGMR) and a method of producing same. In particular, the present teachings relate to a WGMR having a significantly improved optical quality factor and finesse and a method for producing same.

BACKGROUND OF THE INVENTION

WGMRs are useful in photonic devices to conserve photons. WGMRs can be found in microwave receivers, high frequency receivers, parametric compact oscillators, and frequency references. WGMRs can be characterized by two partially dependent values, finesse (F) and quality factor (Q). Q is a parameter defining WGMR performance.

Prior art WGMRs achieve larger finesse values compared with other prior art resonators. For example, fused silica WGMRs with finesse values of $2.3 \times 10^6$ and $2.8 \times 10^6$ have been demonstrated. Crystalline WGMRs reveal even larger finesse values, $F=6.3 \times 10^6$, because of low attenuation of light in the transparent optical crystals. The large values of F and Q result in the enhancement of various nonlinear processes.

The theoretical optimum values for finesse and quality factor of an optical crystalline WGMR at room temperature are $10^{14}$ and $10^9$, respectively. Experimental results using WGMRs of the prior art, however, provide F and Q values that are a thousand times lower than the theoretical optimum. The difference between theoretical values and the experimental results are due to media imperfections. The crystalline material of the WGMR has intrinsic structural defects caused by the processing of the material for the WGMR application. These defects scatter light and therefore limit the Q and F values of the WGMR.

Accordingly, there is a need for a WGMR having improved finesse and quality factor values.

SUMMARY OF THE INVENTION

A method of fabricating a WGMR is provided. The method can include placing a resonator into a container, positioning the container into a furnace, increasing the temperature of the furnace to a temperature above the annealing temperature of the whispering gallery mode resonator, maintaining the temperature of the furnace, cooling the temperature of the furnace over a predetermined period of time, polishing the resonator with an abrasive slurry, and repeating the above at least one time. The polishing step can use an abrasive slurry having a predetermined grain size. Each subsequent polishing iteration can use an abrasive slurry having a predetermined grain size that is smaller than the predetermined grain size of the previous polishing iteration.

A WGMR is provided. The WGMR can be made using the method as described above.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

Figure 1:
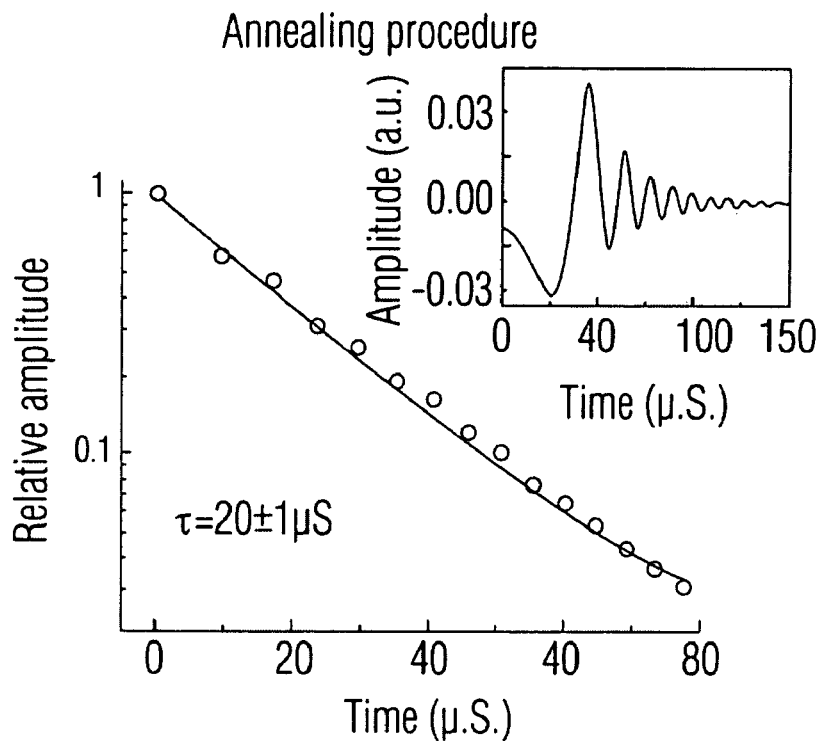
FIG. 1 is a graph detailing a ring-down signal after one annealing and polishing iteration.

It is to be understood that both the foregoing general description and the following detailed description are exemplary and explanatory only, and are intended to provide an explanation of various embodiments of the present teachings.

DETAILED DESCRIPTION OF THE PREFERRED EMBODIMENTS

According to various embodiments, a WGMR can be fabricated by repeating at least once: annealing the WGMR using a process of heating the WGMR, maintaining the elevated temperature of the WGMR, and then cooling the WGMR over a predetermined time; and polishing the WGMR, wherein the WGMR is polished using an abrasive slurry. The particle size of the abrasive slurry can be approximately constant, e.g., the particles are all approximately the same size during any specific polishing iteration. The particle size of the abrasive slurry for each polishing iteration can be smaller that the particle size of the abrasive slurry of the previous polishing iteration.

The WGMR can be fabricated of any suitable material to make a resonator. The WGMR can be fabricated of any suitable material to make a crystalline resonator. For example, the WGMR can be made of calcium fluoride ($CaF_2$), magnesium fluoride ($MgF_2$), barium fluoride ($BaF_2$), crystal quartz, fused silica, or combinations thereof.

According to various embodiments, the annealing process can improve transparency of the material of a resonator. An increased temperature can result in the enhancement of the mobility of defects induced by fabrication process. An increased temperature can also reduce residual stress birefringence. The increased mobility can lead to recombination of the defects and their stirring to the surface. According to various embodiments, annealing procedures of the prior art can be used in the practice of the claimed invention.

The annealing process can include placing the WGMR into a container. The container can be made of the same material as the WGMR or the container can be made of a different material as the WGMR. The container can be made of, for example, $CaF_2$, $BaF_2$, $MgF_2$, fused silica, crystal quartz, or combinations thereof. The container can be sealed. The sealed container can be free of oxygen or can contain oxygen. The sealed container can contain a gas other than oxygen. The sealed container can contain a gas that has low diffusion to a crystalline body. The sealed container can contain an inert gas. For example, the sealed container can contain argon gas. For further example, the sealed container can contain ultra-high-purity (UHP) argon gas.

The annealing process can include placing the container into a furnace. The furnace can be heated to a temperature above room temperature. The furnace can be heated to a temperature that is above the annealing temperature of the material of the WGMR. The furnace can be heated to a temperature that is above the annealing temperature of the material of the WGMR and that is below the temperature at which the material would begin to deform. The furnace can be heated to a temperature that is below the melting temperature of a sub-latice of the WGMR. For example, the sub-latice can be a fluoride sub-latice. For example, the furnace can be heated to a temperature of about 650 degrees Celsius (C). For further example, the furnace can be heated to a temperature of about 1,000 degrees C.

According to various embodiments, the temperature of the furnace can be predetermined based on the material of the WGMR. According to various embodiments, the final quality factor of the WGMR can be based on the temperature of the furnace. The length of the annealing process can depend on the temperature of the furnace. For example, a lower temperature of the furnace can lengthen the annealing process. For further example, a lower temperature of the furnace can increase the quality factor.

The temperature of the furnace can be held approximately constant for a predetermined period of time. For example, the temperature of the furnace can be held constant above an annealing temperature. For example, the temperature of the furnace can be held constant for 24 hours. For further example, the temperature of the furnace can be held constant for 36 hours.

The temperature of the furnace can be cooled over a period of time. The temperature of the furnace can be cooled at a predetermined rate. The temperature of the furnace can be cooled at a constant rate. The temperature of the furnace can be cooled at a constant rate or over a predetermined period of time until the temperature of the furnace is below the annealing temperature of the material of the WGMR.

According to various embodiments, larger furnaces can be used to for the annealing process. According to various embodiments, a large furnace having a lower thermal gradient than a smaller furnace can be used. Thermal gradients within a sample can modify the defect redistribution within the resonator. The amplitude of the gradient can be reduced, for example, by increasing the volume of the oven. The amplitude of the gradient can also be reduced, for example, by increasing thermal conductivity of the container that the resonator is placed into during the annealing procedure. The container can be made of the same material as the WGMR or the container can be made of different material as the WGMR. The container can be made of, for example, calcium fluoride for annealing a calcium fluoride WGMR.

According to various embodiments, the WGMR can be polished. The WGMR can be polished following annealing. The WGMR can be polished using any suitable method for polishing a resonator. For example, the WGMR can be polished using an abrasive slurry. The abrasive slurry can contain any substance that is harder or more abrasive than the material of the WGMR. The abrasive slurry can be, for example, a diamond slurry. The abrasive slurry can contain, for example, polycrystalline diamond particles. Grains in the abrasive slurry can have the same size or same average size. For each subsequent polishing iteration, the grains in the abrasive slurry can have a smaller size or smaller average size than the previous polishing iteration. There can be, for example, a total of two, three, four, or more polishing iterations.

According to various embodiments, the average grain size of the abrasive slurry can be any suitable size to polish the WGMR. For example, the average grain size of a first polishing iteration can be from about 0.15 μm to about 0.35 μm, the average grain size of a second polishing iteration can be from about 0.05 μm to about 0.15 μm, the average grain size of a third polishing iteration can be from about 0.01 μm to about 0.09 μm, and the average grain size of a fourth polishing iteration can be from about 0.001 μm to about 0.009 μm. Subsequent polishing iterations can have similar, smaller average grain sizes. For further example, the average grain size of the first four (4) polishing iterations can be about 0.25 μm, about 0.1 μm, about 0.05 μm, and about 0.01 μm, respectively.

According to various embodiments, the WGMR can be subjected to an annealing process between each polishing iteration. The annealing process between polishing iterations can use the same parameters or different parameters as the initial annealing of the WGMR. For example, the temperature of the first annealing process can be the same as or different from the temperature of the seconding annealing process.

According to various embodiments, thermal annealing procedures in combination with mechanical polishing can produce a riWMGR with record finesse and quality factors. For example, a $CaF_2$ WGMR can have a finesse value of greater than $10^7$ and a quality factor value of greater than $10^{11}$ at 1.55 μm.

According to various embodiments, finesse can be technically more important than quality factor for some WGMR applications. For example, buildup of the optical power inside the resonator as well as the Purcell factor can be proportional to finesse. According to various embodiments, quality factor can be more important than finesse for some WGMR applications. For example, inverse threshold power of intracavity hyperparametric oscillation is proportional to $Q^2$.

Example One

Nonlinear ring-down technique, or ring-down, was used to evaluate finesse and quality factor. A laser frequency was swept quickly across a resonance line. A part of the light was accumulated in the mode during the sweep and was reemitted in the direction of the detector. The reemitted radiation interfered with the laser light. Beat-note signals were then observed. The envelope of the decaying oscillations followed the decay of the amplitude of the reemitted light: The decay was twice as long as intensity decay. Optical quality factor of the cavity is expressed as $Q=\omega\tau/2$.

A fluorite WGMR with optical loss limited by the material attenuation was chosen. The resonator was placed into the center of a 3-feet long air-filled transparent tube made of annealed fused silica. The tube was installed into the horizontal tube furnace. The temperature of the furnace's core was increased from room temperature to 650 Celsius over a time period of three (3) hours. The temperature was kept stable for one day and then the core was cooled over a time period of three (3) hours. The fluorite resonator was then polished using a diamond slurry. The diamond slurry contained polycrystalline diamond particles. The annealing and polishing procedure was repeated for a total of three (3) iterations. The same annealing duration and procedure was used each time, however the average grain size of the diamond slurry used for polishing was gradually decreased. Specifically, the average grain size of the diamond slurry for each polishing iteration was smaller than the average grain size of the diamond slurry of each previous polishing iteration. The average grain size of the diamond slurry for each of the three (3) polishing iteration was 0.25 μm, about 0.1 μm, and about 0.05 μm, respectively.

Figure 2:
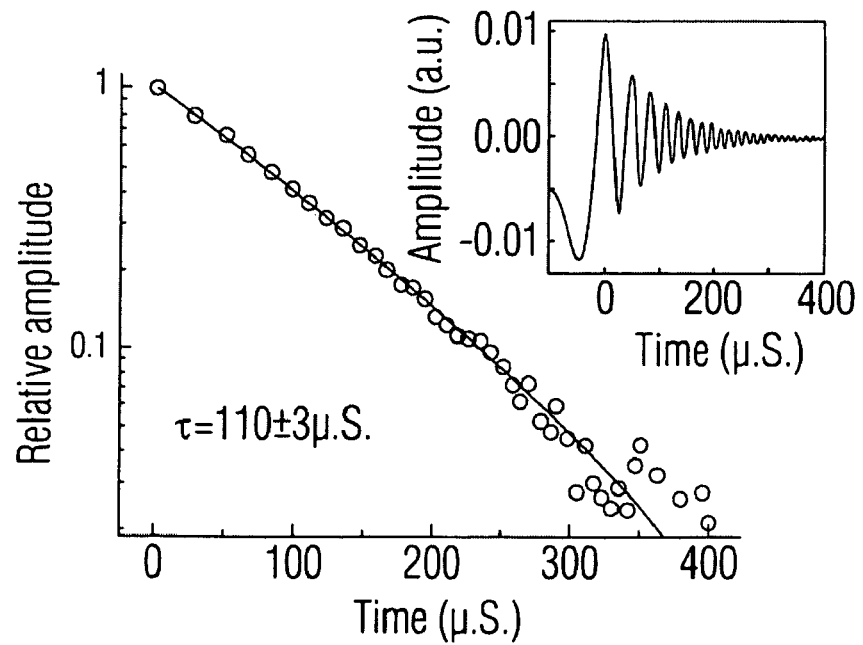
FIG. 2 is a graph detailing a ring-down signal after three annealing and polishing iterations.

As shown in FIG. 1, the measured ring-down spectrum after the first annealing and polishing iteration is shown. However, as shown in FIG. 2, the ring-down time has increased significantly after the third annealing and polishing iteration. Five-fold elongation of optical ring-down time is observed between the first annealing and polishing iteration and the third annealing and polishing iteration, as shown in FIGS. 1 and 2. The final measured quality factor is several times larger compared with the quality factor of calcium fluoride resonators observed in the prior art at 1.55 µm. The exponential fit curve is nonlinear in the logarithmic scale because the exponents have constant offsets. Given that $Q=\omega\tau/2$, and $\omega=2\pi c/\lambda$, $\lambda=1.55$ µm, the values of the quality factors after the first and third annealing stages are $Q=1.2\times 10^{10}$ and $Q=6.7\times 10^{10}$ respectively.

The power in the mode was shown to be above the threshold of the nonlinear loss related to SRS. Ring-down time was measured using low optical power. The excitation of a single WGM was ensured by: the laser emission hitting only one mode such that no doublets were allowed within the investigated frequency span; and the sweep of the frequency of the laser was controlled and the local frequency of the beatnote signal never increased.

The ring-down signal measured with all the precautions discussed above is shown in FIG. 3, imaged using low-power laser radiation (solid line). The theoretical fit of the signal is shown by the dotted line. FIG. 4 is a graph of the evaluated change of the period of the signal. To ensure that the measured line is not a result of several consecutive excitations of the optical mode because of dithering of the laser carrier frequency, the oscillation period of the beat-note was evaluated, as shown in FIG. 4. The carrier frequency gradually moved from the resonance and the WGM was never excited twice.

To evaluate the oscillation period, the positions of the peaks (maxima and minima of the beatnote curve) as well as crossings of the beatnote signal with zero level line were ascertained. The time coordinate of each peak was subtracted from the coordinate of the adjacent peak and this value was related to the moment of time equal to the averaged time for the two adjacent peaks. The same procedure was repeated for the zero-crossing points. As a result, the time dependence of the period of the beat note signal was determined, as shown in FIG. 4. As shown in FIG. 4, the dependence is linear at the tail of the curve. The initial period has different time dependence because the frequency of the WGM changes much faster immediately after the frequency of the pump laser is tuned away from the WGM. The change can be determined by multiple nonlinear processes. For example, the change can be determined by WGM frequency shift due to after-interaction cooling of the resonator.

Using the linear approximation for the beat-note period, the period of the waveform was determined to fit the experimental data. The equation $\phi(t+Period(t)/2)-\phi(t)=\pi$ was solved, approximating it by linear differential equation $\phi(t)=2\pi/Period(t)$. Experimental evidence shows that $Period(t)=\xi-\zeta t$, where $\xi=71.1$ µs, and $\zeta=0.11$ (time t is measured in microseconds). Therefore, the expression $\phi(t)=Const-(2\pi/\zeta)\ln(1-\zeta t/\xi)$ for the phase was derived. The final oscillation waveform presented in FIG. 4 is given by $\cos[\phi(t)]$.

Figure 4:
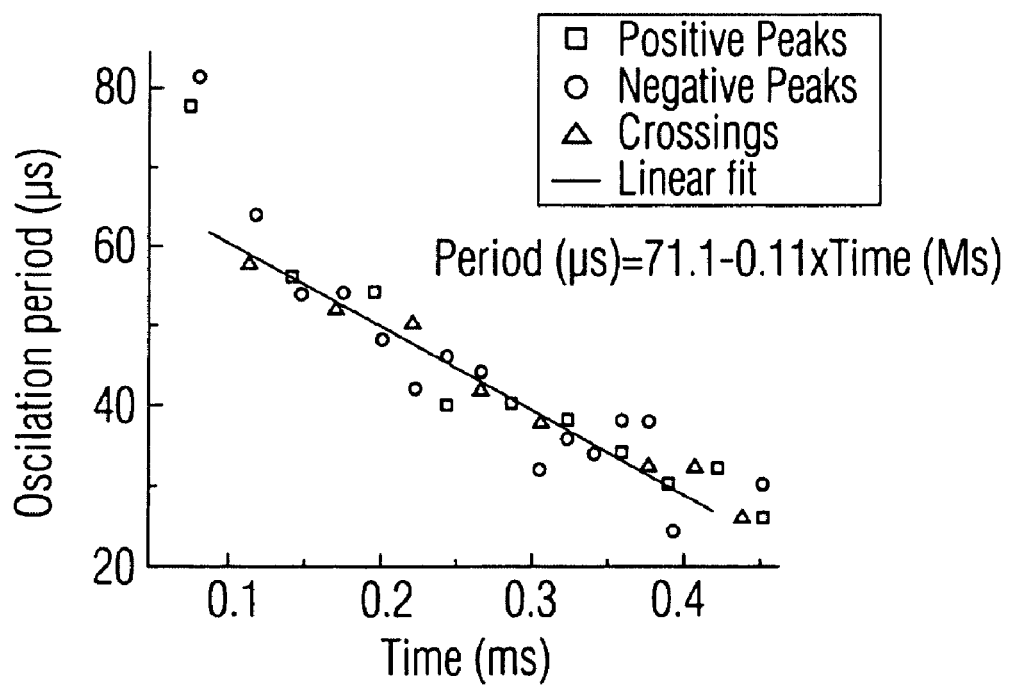
FIG. 4 is a graph detailing change of the period of the signal of FIG. 3.
Figure 5:
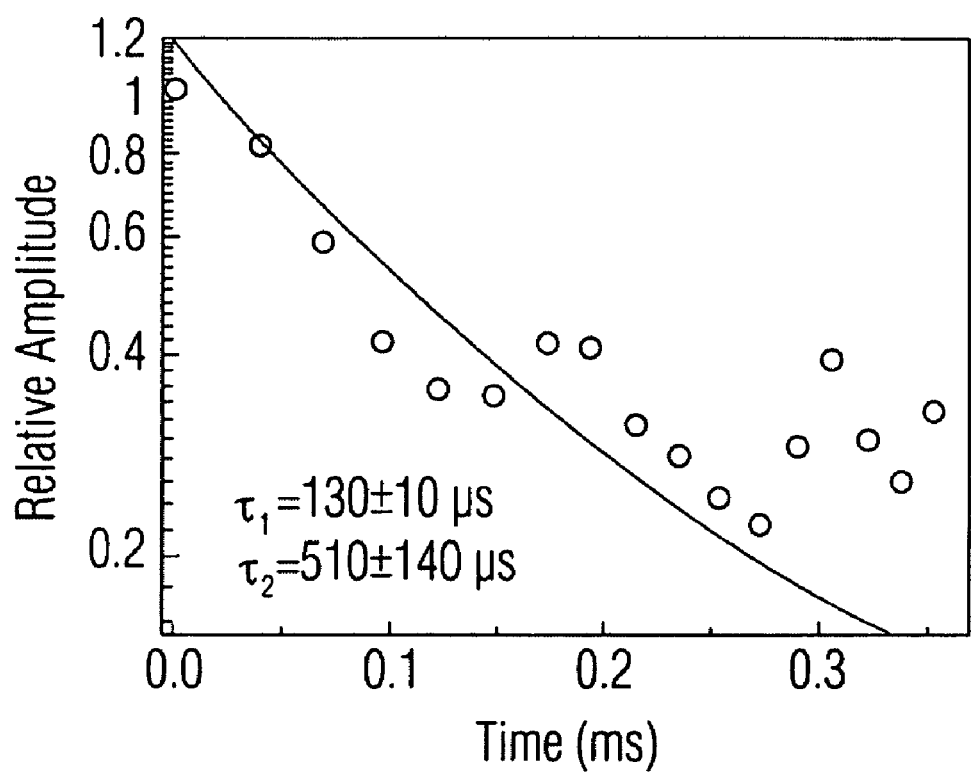
FIG. 5 is a graph detailing change of the signal amplitude of FIG. 3.

The time dependence of the beatnote amplitude was extracted by subtracting the amplitude of a minimum of the beatnote signal from the adjacent maximum of the signal. The value shows the relative oscillation amplitude. This value was related to the moment of time equally separated from the maximum and minimum time coordinate. The results are shown in FIG. 5. Using the first three points of dependence, the initial decay time $\tau_1=130$ µs was determined. Using the part of the signal in the interval between 0.15 ms and 0.35 ms, the final decay time, $\tau_2=510$ µs, was determined. The expression for the nonlinear decay rate was used to fit the amplitude decay rate. The resultant fit of the beat-note waveform is shown in FIG. 4.

Therefore, the intrinsic linear quality factor of the $CaF_2$ WGMR approaches $10^{11}$ at 1.55 µm. The expression for the finesse as well as quality factor of WGMRs can include the index of refraction of the resonator host material: $Q=2\pi a F n_0/\lambda$, and $F=c/[2an_0(\gamma_0+\gamma_c)]$, where a is the radius of the resonator, $n_0$ is the index of refraction of the resonator host material, $\gamma_0$ and $\gamma_c$, are the intrinsic and coupling amplitude decay rates, respectively. The values of the light intensity inside $I_{in}$ and outside $I_0$ the resonator are related as $I_{in}/I_0=2\gamma_c F/[\pi(\gamma_0+\gamma_c)]$. Using the experimental data (2a=0.45 cm, $n_0=1.42$), the finesse of the resonator was calculated to be $F=(2\pm1)\times 10^7$.

Figure 3:
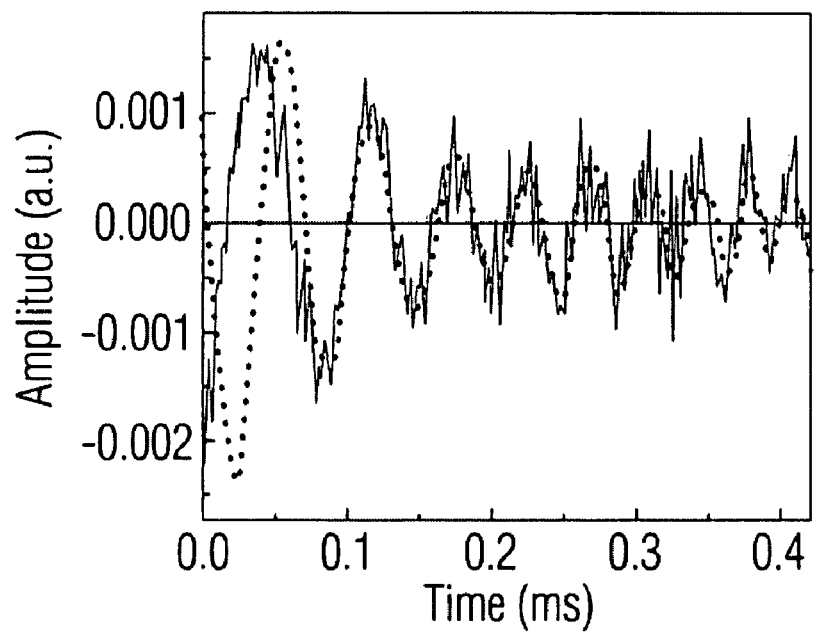
FIG. 3 is a graph detailing a ring-down signal after three annealing and polishing iterations when taken with low-power laser radiation.

FIG. 5 is a graph of change of the signal amplitude shown in FIG. 3 with time. Initial and final quality factors are $Q=(7.9\pm0.5)\times 10^{10}$ and $Q=(3\pm1)\times 10^{11}$, respectively.

The following documents provide background for the claimed invention and are incorporated by reference herein in their entireties:

1. G. Rempe, R. J. Thompson, H. J. Kimble, and R. Lalezari, "Measurement of ultralow losses in an optical interferometer," Opt. Lett. 17, 363-365 (1992).
2. C. J. Flood, H. J. Kimble, and J. Ye, "Characterization of high-finesse mirrors: Loss, phase shifts, and mode structure in an optical cavity," Phys. Rev. A 64, 033804 (2001).
3. H. R. Bilger, P. V. Wells, and G. E. Stedman, "Origins of fundamental limits for reflection losses at multilayer dielectric mirrors," Appl. Opt. 33, 7390-7396 (1994).
4. H.-J. Cho, M.-J. Shin, and J.-C. Lee, "Effects of substrate and deposition method onto the mirror scattering," Appl. Opt. 45, 1440-1446 (2006).
5. E. M. Purcell, "Spontaneous emission probabilities at radio frequencies," Phys. Rev. 69, 681-681 (1946).
6. A. B. Matsko, A. A. Savchenkov, D. Strekalov, V. Ilchenko, and L. Maleki, "Optical hyperparametric oscillations in a whispering-gallery-mode resonator: Threshold and phase diffusion," Phys. Rev. A 71, 033804 (2005).
7. V. S. Ilchenko, A. A. Savchenkov, A. B. Matsko, and Lute Maleki, "Nonlinear Optics and Crystalline Whispering Gallery Mode Cavities," Phys. Rev. Lett. 92, 043903 (2004).
8. D. W. Vernooy, V. S. Ilchenko, H. Mabuchi, E. W. Streed, and H. J. Kimble, "High-Q measurements of fused-silica microspheres in the near infrared," Opt. Lett. 23, 247-249 (1998).
9. T. J. Kippenberg, S. M. Spillane, and K. J. Vahala, "Demonstration of ultra-high-Q small mode volume toroid microcavities on a chip," Appl. Phys. Lett. 85, 6113-6115 (2004).
10. I. S. Grudinin, V. S. Ilchenko, and L. Maleki, "Ultrahigh optical Q factors of crystalline resonators in the linear regime," Phys. Rev. A 74, 063806 (2006).
11. S. M. Spillane, T. J. Kippenberg, and K. J. Vahala, "Ultralow-threshold Raman laser using a spherical dielectric microcavity," Nature 415, 621-623 (2002).
12. I. S. Grudinin and L. Maleki, "Ultralow-threshold Raman lasing with $CaF_2$ resonators," Opt. Lett. 32, 166-168 (2007).
13. T. J. Kippenberg, H. Rokhsari, T. Carmon, A. Scherer, and K. J. Vahala, "Analysis of Radiation-Pressure Induced Mechanical Oscillation of an Optical Microcavity," Phys. Rev. Lett. 95, 033901 (2005).

14. T. J. Kippenberg, S. M. Spillane, and K. J. Vahala, "Kerr-Nonlinearity Optical Parametric Oscillation in an Ultrahigh-Q Toroid Microcavity," Phys. Rev. Leu. 93, 083904 (2004).
15. A. A. Savchenkov, A. B. Matsko, D. Strekalov, M. Mohageg, V. S. Ilchenko, and L. Maleki, "Low Threshold Optical Oscillations in a Whispering Gallery Mode $CaF_2$ Resonator," Phys. Rev. Left. 93, 243905 (2004).
16. V. B. Braginsky, V. S. Ilchenko, and K. S. Bagdassarov, "Experimental observation of fundamental microwave absorption in high quality dielectric crystals," Phys. Lett. A 120, 300-305 (1987).
17. A. A. Savchenkov, A. B. Matsko, M. Mohageg, and L. Maleki, "Ringdown spectroscopy of stimulated Raman scattering in a whispering gallery mode resonator," Opt. Lett. 32, 497-499 (2007).
18. A. A. Savchenkov, V. S. Ilchenko, A. B. Matsko, and L. Maleki "Kilohertz optical resonances in dielectric crystal cavities," Phys. Rev. A 70, Art. No. 0518048 (2004).
19. A. B. Matsko, A. A. Savchenkov, and L. Maleki, "Ringdown spectroscopy for studying properties of CW Raman lasers," Opt. Commun. 260, 662-665 (2006).
20. B. Wang, R. R. Rockwell, and J. List, "Linear birefringence in $CaF_2$ measured at deep ultraviolet and visible wavelengths", J. Microlithography, Microfabrication, and Microsystems 3, 115-121 (2004).
21. V. Deuster, M. Schick, Th. Kayser, H. Dabringhaus, H. Klapper and K. Wandelt, "Studies of the facetting of the polished (100) face of $CaF_2$," Journal of Crystal Growth 250, 313-323 (2003).
22. Q.-Z. Zhao, J.-R. Qiu, X.-W. Jiang, C.-J. Zhao, and C.-S. Zhu, "Fabrication of internal diffraction gratings in calcium fluoride crystals by a focused femtosecond laser," Opt. Express 12, 742-746 (2004).

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A method of fabricating a whispering gallery mode resonator, comprising:
    placing a resonator into a container;
    positioning the container into a furnace;
    increasing the temperature of the furnace to a temperature above the annealing temperature of the whispering gallery mode resonator;
    maintaining the temperature of the furnace;
    cooling the temperature of the furnace over a predetermined period of time;
    polishing the resonator with an abrasive slurry;
    repeating the above at least one time;
    wherein the abrasive slurry has a predetermined grain size and each subsequent polishing iteration uses an abrasive slurry having a predetermined grain size that is smaller than the predetermined grain size of the previous polishing iteration.
2. The method of claim 1, wherein the temperature of the furnace is heated to about 650 degrees Celsius.
3. The method of claim 1, wherein the abrasive slurry is a polycrystalline diamond slurry.
4. The method of claim 1, wherein the average particle size of the abrasive slurry is about 0.25 μm, about 0.1 μm, and about 0.05 μm, respectively, for the first three polishing iterations.
5. The method of claim 1, wherein annealing and polishing of the whispering gallery mode resonator are repeated for a total of three iterations.
6. The method of claim 1, wherein the whispering gallery mode resonator is formed of calcium fluoride, magnesium fluoride, barium fluoride, crystal quartz, or combinations thereof.
7. The method of claim 1, wherein an atmospheric gas is present inside the container.
8. The method of claim 1, wherein an inert gas is present inside the container.
9. The method of claim 8, wherein the inert gas is ultra-high-purity argon gas.
10. The method of claim 1, wherein the container is made of annealed fused silica.
11. A whispering gallery mode resonator, wherein the whispering gallery mode resonator is made by the method of claim 1.
12. The whispering gallery mode resonator of claim 11, wherein the temperature of the furnace is heated to about 650 degrees Celsius.
13. The whispering gallery mode resonator of claim 11, wherein the abrasive slurry is a polycrystalline diamond slurry.
14. The whispering gallery mode resonator of claim 11, wherein the average particle size of the abrasive slurry is about 0.25 μm, about 0.1 μm, and about 0.05 μm, respectively, for the first three polishing iterations.
15. The whispering gallery mode resonator of claim 11, wherein annealing and polishing of the whispering gallery mode resonator are repeated for a total of three iterations.
16. The whispering gallery mode resonator of claim 11, wherein the whispering gallery mode resonator contains calcium fluoride, magnesium fluoride, barium fluoride, crystal quartz, or combinations thereof.
17. The whispering gallery mode resonator of claim 11, wherein an atmospheric gas is present inside the container.
18. The whispering gallery mode resonator of claim 11, wherein an inert gas is present inside the container.
19. The whispering gallery mode resonator of claim 18, wherein the inert gas is ultra-high-purity argon gas.
20. The whispering gallery mode resonator of claim 11, wherein the container is made of annealed fused silica.

* * * * *